United States Patent
Dudash et al.

(10) Patent No.: US 7,213,887 B2
(45) Date of Patent: May 8, 2007

(54) ATTACHMENT OF HEAD REST GUIDE TUBE TO VEHICLE SEAT FRAME

(75) Inventors: Eugene S. Dudash, Wixom, MI (US); Mark Stanisz, Waterford, MI (US); Eric A. Smitterberg, Berkley, MI (US); L. Keith Hensley, Farmington Hills, MI (US); Sanford E. Cook, Belleville, MI (US); Kevin J. Fudala, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/904,938

(22) Filed: Dec. 6, 2004

(65) Prior Publication Data

US 2005/0121955 A1  Jun. 9, 2005

Related U.S. Application Data

(62) Division of application No. 09/820,147, filed on Mar. 28, 2001, now Pat. No. 6,836,951, which is a division of application No. 09/014,875, filed on Jan. 28, 1998, now Pat. No. 6,223,436, which is a division of application No. 08/660,523, filed on Jun. 7, 1996, now Pat. No. 5,769,499.

(51) Int. Cl.
   *A47C 7/02* (2006.01)

(52) U.S. Cl. ............... 297/452.18; 297/391; 297/404; 297/463.1; 297/410

(58) Field of Classification Search ............... 297/404, 297/391, 452.18, 452.2, 410, 463.1, 463.2; 403/247, 372, 400, 388, 282; 256/22

See application file for complete search history.

(56) References Cited

U.S. PATENT DOCUMENTS

| | | | | |
|---|---|---|---|---|
| 2,530,855 A | * | 11/1950 | Bugg et al. | 29/890.044 |
| 3,159,427 A | * | 12/1964 | Lawson | 297/410 |
| 3,286,539 A | | 11/1966 | Loper et al. | |
| 3,327,385 A | * | 6/1967 | Shaver | 29/512 |
| 3,345,730 A | | 10/1967 | Laverty | |
| 3,586,376 A | * | 6/1971 | Mire | 297/452.2 |
| 3,895,939 A | | 7/1975 | Brooks et al. | |
| 4,100,668 A | | 7/1978 | Ruff et al. | |
| 4,159,650 A | * | 7/1979 | Maguire | 73/847 |
| 4,423,905 A | * | 1/1984 | Ray | 297/391 |
| 4,519,650 A | | 5/1985 | Terada et al. | |
| 4,522,443 A | | 6/1985 | Van Blankenburg | |
| 4,544,204 A | | 10/1985 | Schmale | |
| 4,626,028 A | * | 12/1986 | Hatsutta et al. | 297/289 |
| 4,631,797 A | | 12/1986 | Hill | |

(Continued)

FOREIGN PATENT DOCUMENTS

EP        0 233 822 A2    8/1987

(Continued)

*Primary Examiner*—David R. Dunn
*Assistant Examiner*—Erika Garrett
(74) *Attorney, Agent, or Firm*—Brooks Kushman P.C.

(57) ABSTRACT

A vehicle seat assembly includes a seat back frame having an aperture extending therethrough, and a head rest guide tube disposed in the aperture. The guide tube has a radially extending swaged portion engaged with the seat back frame for securing the guide tube to the seat back frame.

30 Claims, 5 Drawing Sheets

U.S. PATENT DOCUMENTS

| | | | |
|---|---|---|---|
| 4,656,721 A * | 4/1987 | Werner | 29/523 |
| 4,695,097 A * | 9/1987 | Muraishi | 297/452.18 |
| 4,698,968 A | 10/1987 | Mestieri | |
| 4,844,545 A | 7/1989 | Ishii | |
| 4,858,994 A * | 8/1989 | Yamashita | 297/391 |
| 4,923,250 A * | 5/1990 | Hattori | 297/410 |
| 4,976,493 A | 12/1990 | Frankila | |
| 5,044,693 A * | 9/1991 | Yokota | 297/452.18 |
| 5,092,634 A | 3/1992 | Miller | |
| 5,123,706 A * | 6/1992 | Granzow et al. | 297/452.18 |
| 5,129,707 A * | 7/1992 | Yamauchi | 297/216.14 |
| 5,251,963 A * | 10/1993 | Inayoshi et al. | 297/452.29 |
| 5,253,924 A * | 10/1993 | Glance | 297/452.1 |
| 5,290,091 A * | 3/1994 | Dellanno et al. | 297/391 |
| 5,367,759 A | 11/1994 | Loew et al. | |
| 5,378,043 A * | 1/1995 | Viano et al. | 297/408 |
| 5,393,488 A | 2/1995 | Rhoads et al. | |
| 5,401,072 A | 3/1995 | Farrand | |
| 5,412,860 A | 5/1995 | Miyauchi et al. | |
| 5,445,434 A * | 8/1995 | Kohut | 297/391 |
| 5,484,189 A * | 1/1996 | Patterson | 297/410 |
| 5,498,096 A * | 3/1996 | Johnson | 403/267 |
| 5,499,863 A * | 3/1996 | Nakane et al. | 297/452.2 |
| 5,509,716 A * | 4/1996 | Kolena et al. | 297/216.13 |
| 5,522,640 A | 6/1996 | Bilezikjian | |
| 5,547,259 A * | 8/1996 | Fredrick | 297/452.18 |
| 5,636,901 A | 6/1997 | Grilliot et al. | |
| 5,671,521 A | 9/1997 | Briles | |
| 5,671,976 A * | 9/1997 | Fredrick | 297/452.18 |
| 5,749,135 A | 5/1998 | Crane et al. | |
| 5,769,499 A | 6/1998 | Dudash et al. | |
| 5,810,446 A | 9/1998 | Tadokoro | |
| 5,938,279 A * | 8/1999 | Schubring et al. | 297/216.12 |
| 6,007,154 A * | 12/1999 | Parker et al. | 297/410 |
| 6,035,516 A | 3/2000 | Petersen | |
| 2,458,095 A1 | 12/2004 | OConnor | |

FOREIGN PATENT DOCUMENTS

| | | |
|---|---|---|
| GB | 2 324 490 A | 10/1998 |
| JP | 4-303032 A2 | 10/1992 |
| JP | 5-123783 A2 | 5/1993 |

* cited by examiner

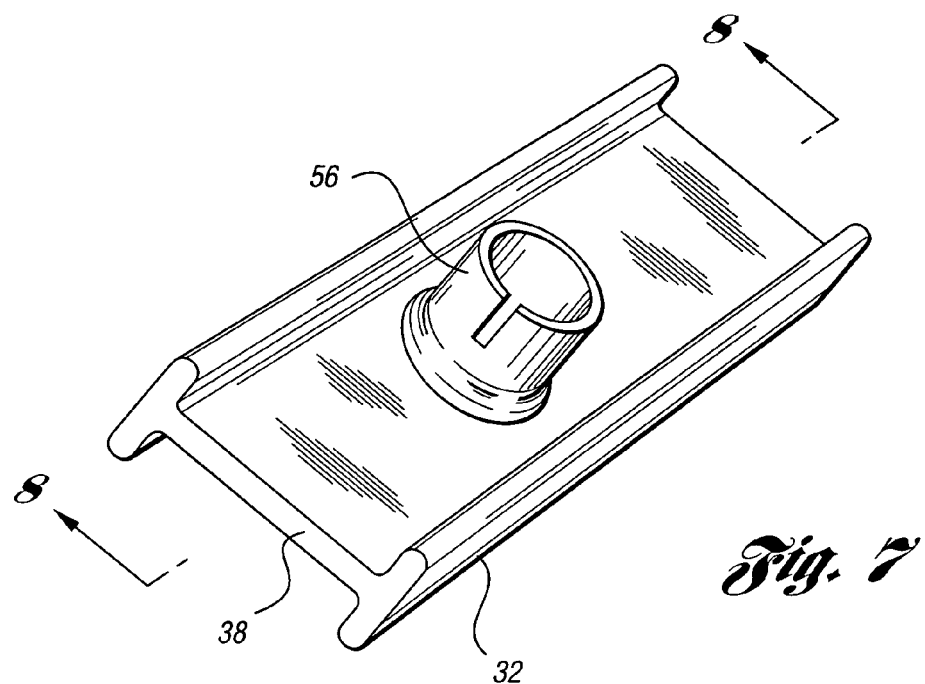
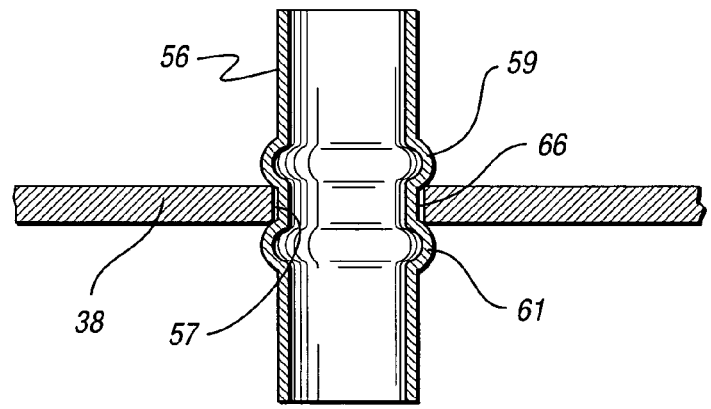
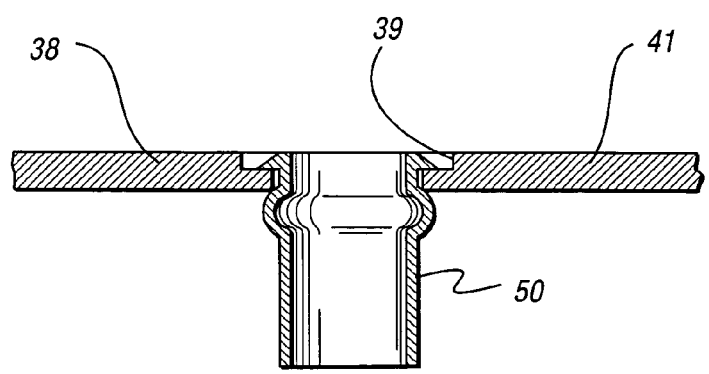

ATTACHMENT OF HEAD REST GUIDE TUBE TO VEHICLE SEAT FRAME

CROSS-REFERENCE TO RELATED APPLICATIONS

This application is a division of U.S. application Ser. No. 09/820,147 filed Mar. 28, 2001 now U.S. Pat. No. 6,836,951, which is a division of U.S. application Ser. No. 09/014,875 filed Jan. 28, 1998, now U.S. Pat. No. 6,223,436 that issued on May 1, 2001, which is a division of U.S. application Ser. No. 08/660,523 filed Jun. 7, 1996, now U.S. Pat. No. 5,769,499 that issued on Jun. 23, 1998.

BACKGROUND OF THE INVENTION

1. Field of the Invention

The invention relates to a vehicle seat assembly having a head rest guide tube attached to a seat back frame.

2. Background Art

Typically, vehicle seat assemblies include a recliner mechanism which supports a substantially U-shaped seat back frame with a cross-member extending across the back frame, and head rest guide tubes extending through the back frame for supporting a head rest assembly. Normally, an aluminum back frame comprises a hollow aluminum tube bent into a U-shaped configuration. The tube is usually bent in an unheat-treated condition, and then heat-treated after bending, or alternatively, the tube is annealed locally for bending. The heat-treating operation adds substantial manufacturing, handling, and shipping costs to the assembly.

The prior art bent tubes are deformed in the upper bending corners and have thin walls in the attachment areas, which results in a high shear stress. The thin attachment areas require a splint or insert to be inserted therein to reduce the shear stress. Furthermore, for attachment of the head rest guide tubes, apertures must be bored through both sides of the back frame tube, which may be awkward and may unnecessarily increase manufacturing costs. A prior method for securing the head rest guide tubes to the back frame includes welding the head rest guide tubes to the back frame.

SUMMARY OF THE INVENTION

Under the invention, a vehicle seat assembly is provided. In one embodiment, the assembly includes a seat back frame having an aperture extending therethrough, and a headrest guide tube disposed in the aperture. The guide tube has first and second radially extending swaged portions engaged with the seat back frame for securing the guide tube to the seat back frame.

In another embodiment, the assembly includes a seat back frame having an aperture extending therethrough, and a head rest guide tube disposed in the aperture. The guide tube has a radially extending swaged portion engaged with the seat back frame for securing the guide tube to the seat back frame.

In yet another embodiment, the assembly includes a seat back frame having an aperture extending therethrough, and a head rest guide tube disposed in the aperture. The guide tube has first and second radially extending swaged portions that are disposed on opposite sides of the seat back frame for securing the guide tube to the seat back frame.

BRIEF DESCRIPTION OF THE DRAWINGS

FIG. 7 shows a cutaway perspective view of a seat back frame with a head rest guide tube secured thereto;

FIG. 8 shows a cross-sectional view of the seat back frame and head rest guide tube shown in FIG. 7; and FIG. 9 shows a vertical cross-sectional view of a lower attachment bolt secured to the back frame.

DETAILED DESCRIPTION OF THE PREFERRED EMBODIMENT(S)

Application Ser. No. 09/820,147 is hereby incorporated by reference in its entirety.

Figure 1:
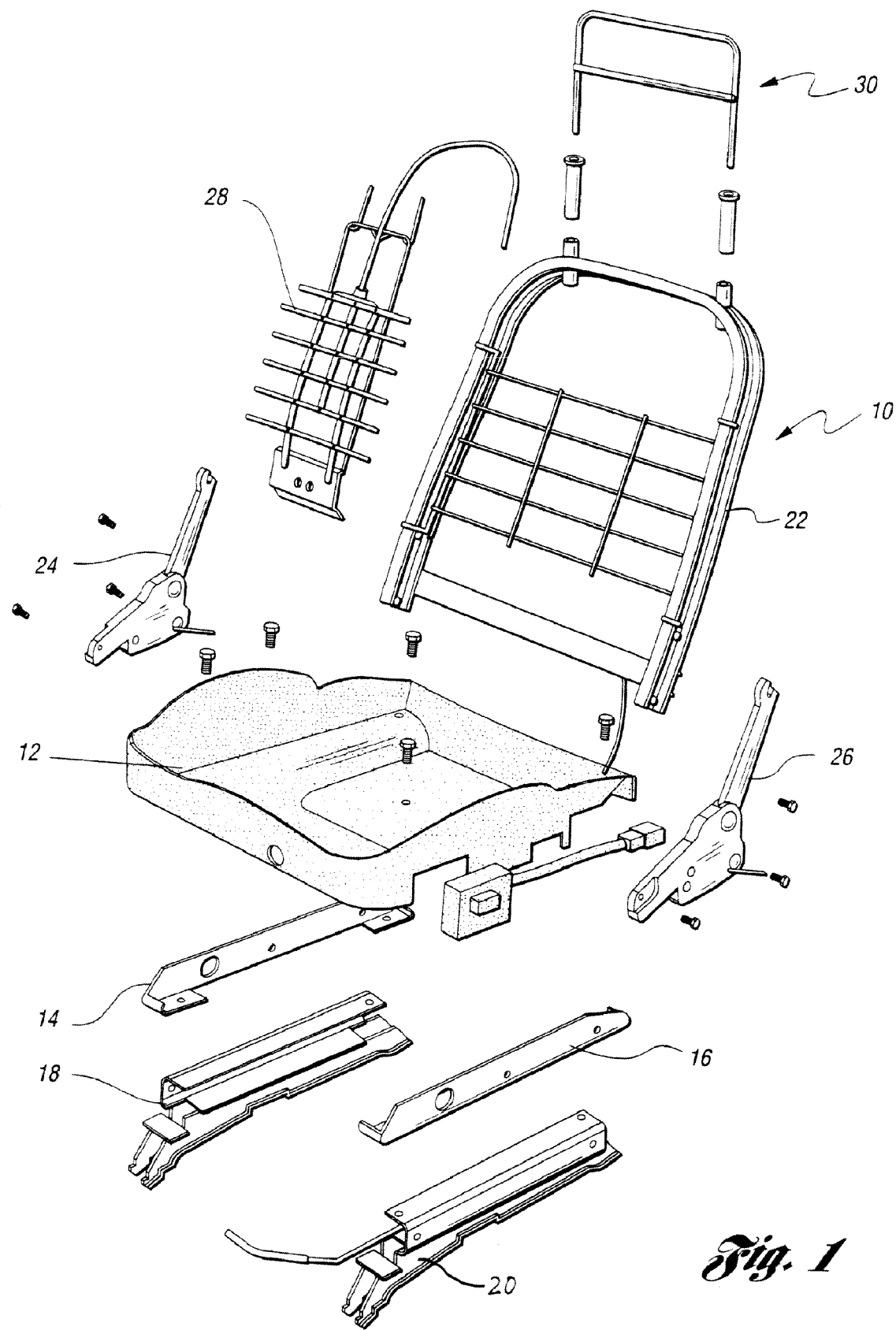
FIG. 1 shows an exploded perspective view of a vehicle seat assembly in accordance with the present invention.

FIG. 1 shows an exploded perspective view of a vehicle seat assembly 10 in accordance with the present invention. The assembly 10 includes a cushion frame 12 supported by a pair of support brackets 14,16. The support brackets 14,16 are mounted by the seat adjusters 18,20, which mount the assembly in the vehicle. The seat back frame 22 is pivotally mounted with respect to the cushion frame 12 by means of the recliner mechanism 24,26. The seat back frame 22 includes a lumbar support structure 28 mounted thereto, as well as a head rest support assembly 30 for supporting a head rest cushion with respect to the seat back frame 22.

Figure 2:
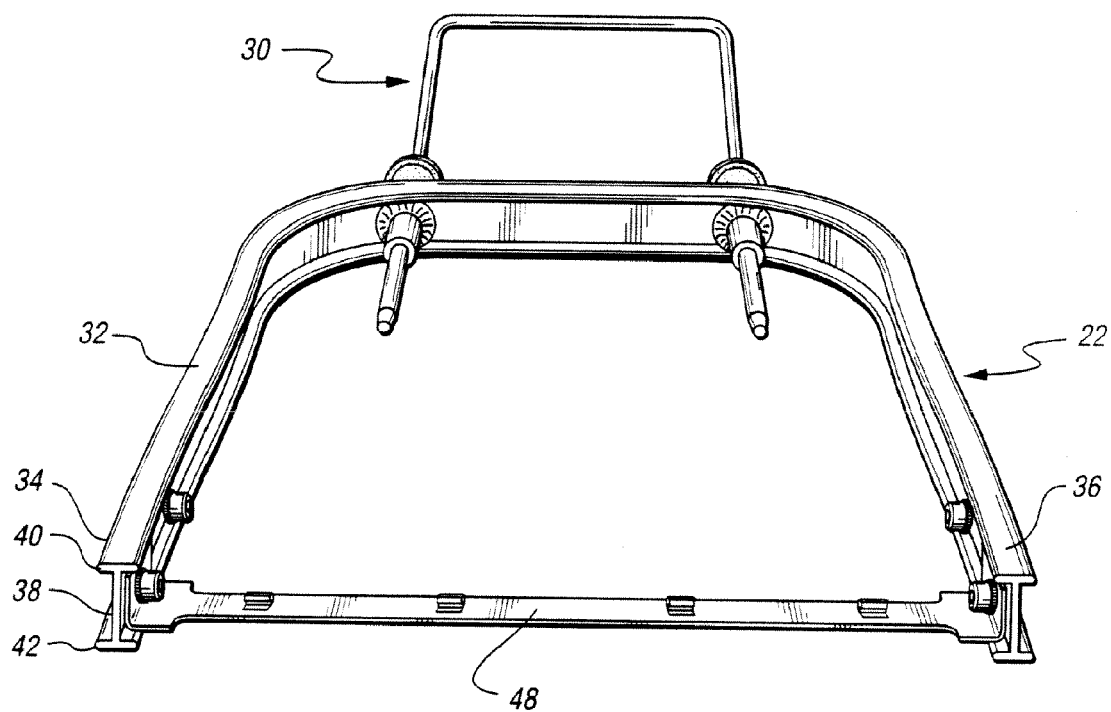
FIG. 2 shows a perspective end view of a seat back frame assembly in accordance with the present invention.
Figure 3:
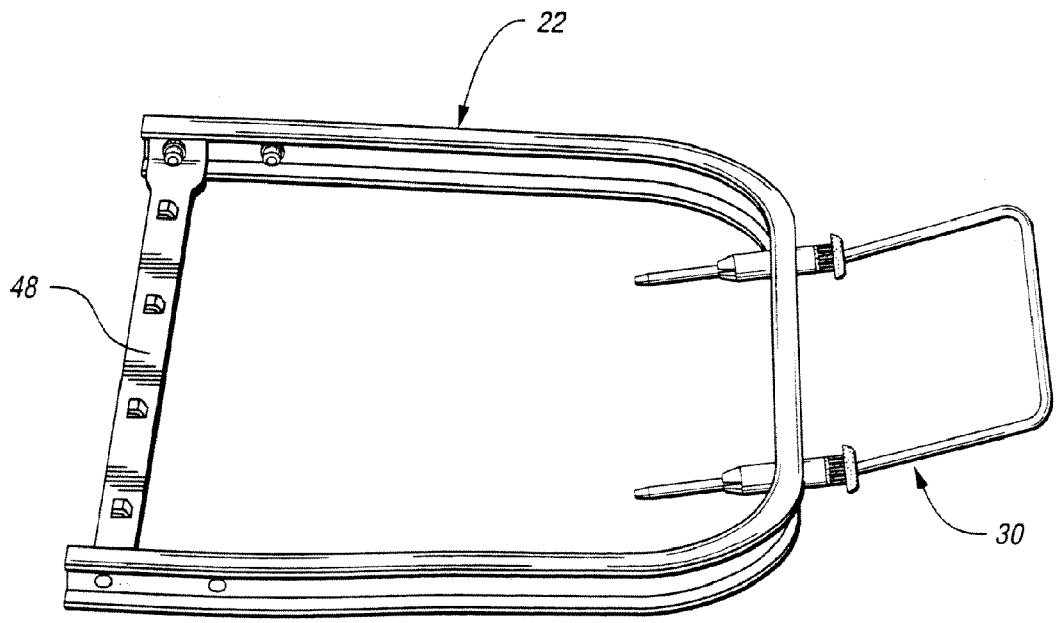
FIG. 3 shows a side perspective view of the seat back frame assembly shown in FIG. 2.
Figure 5:
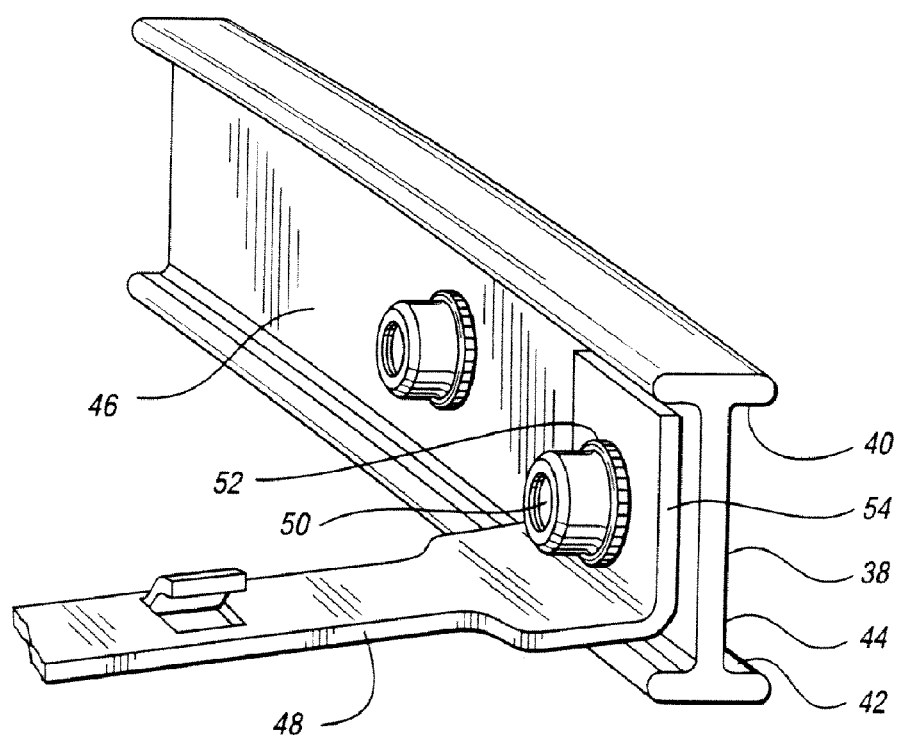
FIG. 5 shows a perspective view of a seat back frame with a swage-bolted cross-member in accordance with the present invention.

The seat back frame 22 is more clearly shown in FIGS. 2 and 3. The seat back frame 22 comprises an aluminum I-beam 32 bent in a substantially U-shaped configuration. The I-beam 32 includes opposing ends 34,36 which are pivotally supported with respect to the vehicle by the recliner mechanisms 24,26. The I-beam 32 includes a center support 38 positioned between first and second flanges 40,42 extending the length of the I-beam 32. The center support 38 and first and second flanges 40,42 are more clearly shown in FIG. 5. In this configuration, the I-beam 32 forms an outwardly-facing channel 44, and an inwardly-facing channel 46.

Returning to FIG. 2, the seat back frame 22 includes a cross-member 48 extending between the opposing ends 34,36 of the I-beam 32. Turning back to FIG. 5, the cross-member 48 is secured to the center support portion 38 of the I-beam 32 by the nuts 50. The bolts 50 include a flange 52 which is swaged against the dowel portion 54 of the cross-member 48 for securing the cross-member 48 with respect to the I-beam 32. In this manner, a welding operation is eliminated from the seat back frame assembly process. As shown in FIG. 9, the center support portion 38 includes a countersink 39 on the outer surface 41 so that the nut 50 may be secured flush with the outer surface 41.

Figure 4:
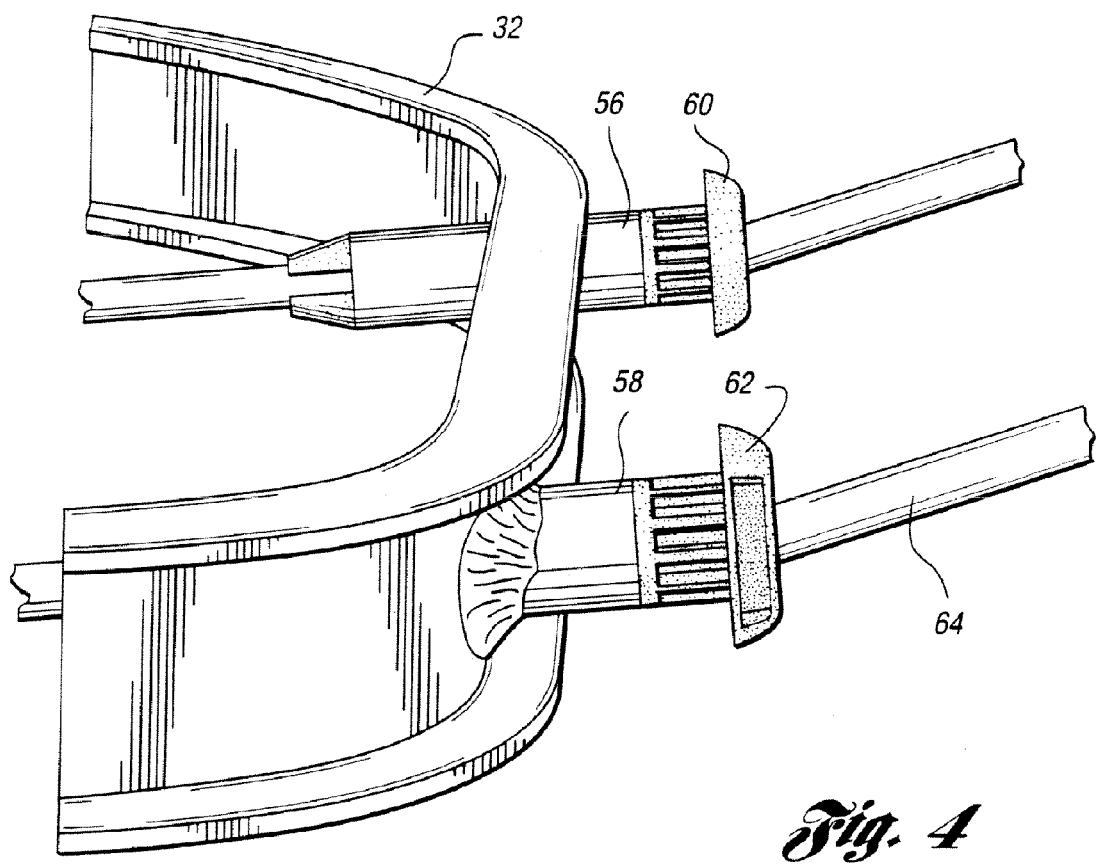
FIG. 4 shows a partial perspective view of a seat back frame and head rest assembly in accordance with the present invention.

Referring to FIGS. 3 and 4, the head rest support assembly 30 is more clearly shown. The head rest support assembly 30 includes a pair of head rest guide tubes 56,58 which are welded into position within a pair of apertures formed in the center support section 38 of the I-beam 32. Alternatively, the head rest guide tubes 56,58 could be swaged into position for support with respect to the I-beam 32 (as discussed below with reference to FIGS. 7 and 8). Plastic head rest adjustment mechanisms 60,62 are supported within the guide tubes 56,58. A head rest support bar 64 is adjustably supported within the plastic adjustment mechanisms 60,62 for vertical adjustment of the head rest.

With this I-beam configuration, a substantial portion of the seat back frame 22 mass is away from the center of mass, which gives better moment of inertia characteristics, thereby reducing bending stress. A bending stress formula is illustrated below:

$$\sigma = \frac{My}{I}$$

where σ is the bending stress, M is the bending moment, y is the distance from the center of mass to the point of maximum stress, and I is the moment of inertia. Accordingly, as the moment of inertia (I) increases, bending stress is reduced. Therefore, structural integrity of the seat back frame is improved in comparison to the prior art tubular back frames.

Figure 6:
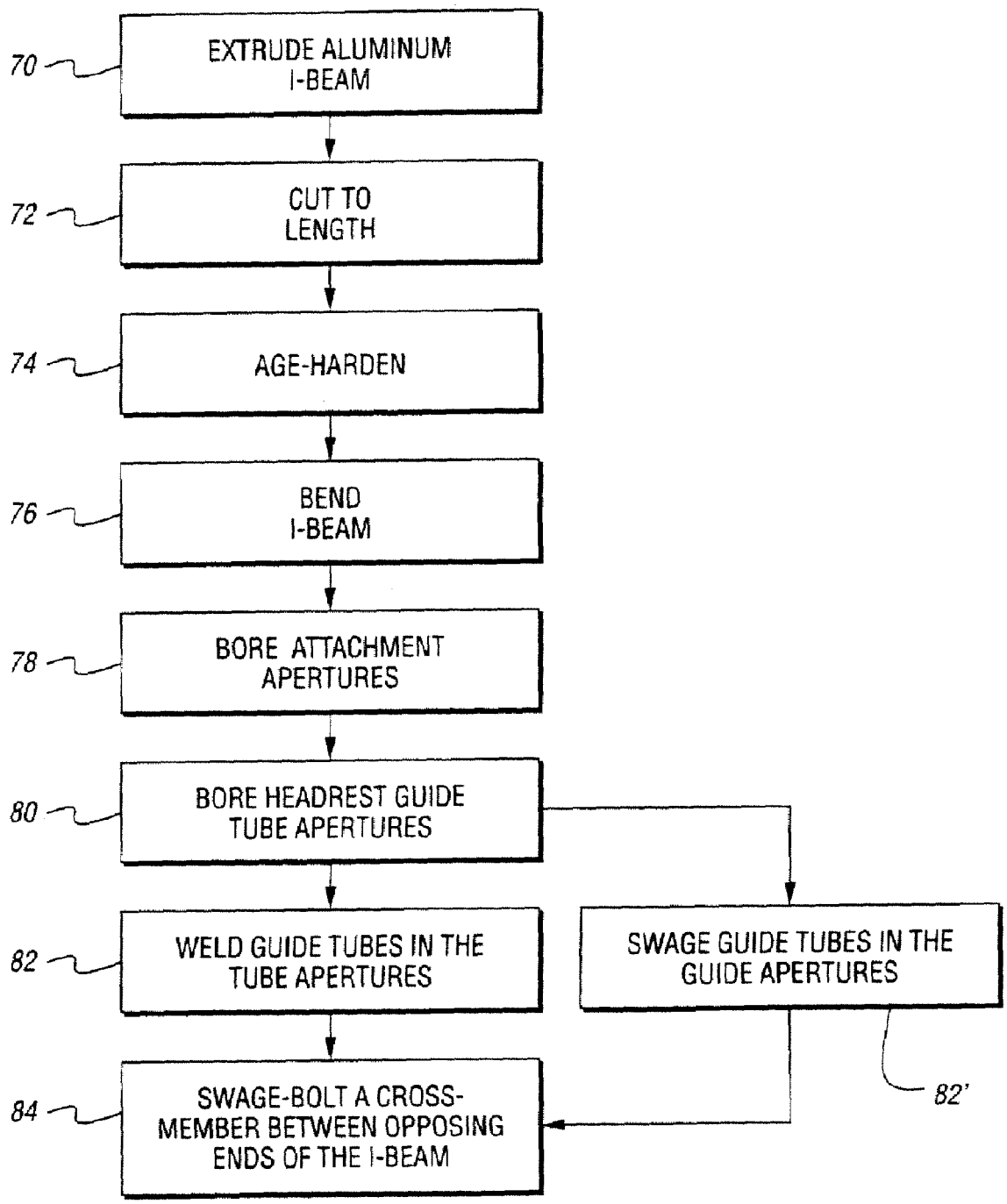
FIG. 6 schematically illustrates method steps for manufacturing a vehicle seat back frame in accordance with the present invention.

The present invention also provides a method of manufacturing a seat back frame, as illustrated in FIG. 6. The method includes extruding an aluminum I-beam (step 70); cutting the I-beam to a desired length (step 72); age-hardening the I-beam (step 74); roll-bending the I-beam in a bend fixture (step 76); boring attachment apertures in the I-beam (step 78); and boring head rest guide tube apertures in the I-beam (step 80). The method further comprises welding guide tubes in the guide tube apertures (step 82), or swaging guide tubes in the guide tube apertures (step 82'); and swage-bolting a cross-member between opposing ends of the I-beam (step 84). In this manner, the aluminum I-beam may be purchased in a T6 (fully age-hardened) condition, rather than purchasing in a lower T4 condition, which would require post-bending of the I-beam and then shipping the I-beam back to an appropriate facility for age-hardening to the T-6 condition. Elimination of the step of locally annealing the back frame for bending, or bending the back frame in an unheat-treated condition, and then heat-treating after the bending operation, will significantly reduce manufacturing costs.

FIGS. 7 and 8 illustrate a double-swaging attachment of the guide tube 56 to the flat portion (center support) 38 of the I-beam 32. The guide tube 56 is inserted into an aperture 57 formed in the substantially flat center support 38, and is swaged on both sides of the flat section 38 whereby to secure the guide tube 56 within the aperture 57. The swaged portions 59,61 abut the flat center support 38 for securing the guide tube 56.

As shown in FIG. 8, the swaged portions 59,61 are disposed on opposite sides of a laterally extending portion of the flat center support 38. Furthermore, as also shown in FIG. 8, the guide tube 56 includes an intermediate portion 66 disposed between the swaged portions 59,61 and positioned in the aperture 57. Each swaged portion 59,61 extends radially beyond, or outwardly of, the intermediate portion 66.

Preferably, the guide tube 56 has one swaged portion 59 pre-formed, then it is inserted into the aperture 57, and the second swaged portion 61 is formed after insertion. This configuration eliminates welding of the guide tubes, which would require aluminum guide tubes to cooperate with the aluminum back frame. By swaging rather than welding, a steel or other available headrest guide tube could be used.

While the best modes for carrying out the invention have been described in detail, those familiar with the art to which this invention relates will recognize various alternative designs and embodiments for practicing the invention within the scope of the appended claims.

What is claimed is:

1. A vehicle seat assembly comprising:
   a seat back frame having an aperture extending therethrough; and
   a head rest guide tube disposed in the aperture and having first and second radially extending swaged portions engaged with the seat back frame for securing the guide tube to the seat back frame;
   wherein the seat back frame includes an additional aperture, and the assembly includes an additional head rest guide tube disposed in the additional aperture, the additional guide tube having first and second radially extending swaged portions engaged with the seat back frame for securing the additional guide tube to the seat back frame.

2. The assembly of claim 1 wherein the seat back frame includes a flat portion, and the aperture extends through the flat portion.

3. The assembly of claim 1 wherein, for each head rest guide tube, the first and second radially extending swaged portions are disposed on opposite sides of the seat back frame such that the seat back frame is sandwiched between the swaged portions.

4. The assembly of claim 1 wherein the seat back frame includes a laterally extending portion, and, for each head rest guide tube, the first and second radially extending swaged portions are disposed on opposite sides of the laterally extending portion of the seat back frame.

5. The assembly of claim 1 wherein the head rest guide tube includes an intermediate portion disposed between the swaged portions of the head rest guide tube and positioned in the aperture, and the swaged portions of the head rest guide tube extend radially beyond the intermediate portion.

6. The assembly of claim 5 wherein the first and second radially extending swaged portions of the head rest guide tube are disposed on opposite sides of the seat back frame such that the seat back frame is sandwiched between the swaged portions of the head rest guide tube.

7. The assembly of claim 1 further comprising a head rest support bar adjustably supported within the head rest guide tube.

8. The assembly of claim 1 further comprising a head rest adjustment mechanism supported by the head rest guide tube, and a head rest support bar adjustably supported within the head rest adjustment mechanism.

9. The assembly of claim 1 wherein the seat back frame comprises aluminum, and the head rest guide tube comprises steel.

10. The assembly of claim 1 wherein each swaged portion has an annular shape.

11. A vehicle seat assembly comprising:
    a seat back frame having an aperture extending therethrough; and
    a head rest guide tube disposed in the aperture and having a radially extending swaged portion engaged with the seat back frame for securing the guide tube to the seat back frame;
    wherein the seat back frame includes a flat portion, and the aperture extends through the flat portion.

12. The assembly of claim 11 wherein the seat back frame includes an additional aperture, and the assembly includes an additional head rest guide tube disposed in the additional aperture, the additional guide tube having a radially extending swaged portion engaged with the seat back frame for securing the additional guide tube to the seat back frame.

13. The assembly of claim 11 wherein the head rest guide tube includes a tube portion disposed adjacent the swaged portion and extending into the aperture, and wherein the swaged portion extends radially beyond the tube portion.

14. The assembly of claim 11 wherein the head rest guide tube includes an intermediate portion disposed between the swaged portions and positioned in the aperture, and the swaged portions extend radially beyond the intermediate portion.

15. The assembly of claim 11 further comprising a head rest support bar adjustably supported within the head rest guide tube.

16. The assembly of claim 11 further comprising a head rest adjustment mechanism supported by the head rest guide tube, and a head rest support bar adjustably supported within the head rest adjustment mechanism.

17. The assembly of claim 11 wherein the seat back frame comprises aluminum, and the head rest guide tube comprises steel.

18. The assembly of claim 11 wherein the swaged portion has an annular shape.

19. A vehicle seat assembly comprising:
    a seat back frame having an aperture extending therethrough; and
    a head rest guide tube disposed in the aperture and having first and second radially extending swaged portions that are disposed on opposite sides of the seat back frame for securing the guide tube to the seat back frame;
    wherein the head rest guide tube includes an intermediate portion disposed between the swaged portions and positioned in the aperture, and the swaged portions extend radially beyond the intermediate portion.

20. The assembly of claim 19 wherein the seat back frame includes an additional aperture, and the assembly includes an additional head rest guide tube disposed in the additional aperture, the additional guide tube having first and second radially extending swaged portions disposed on opposite sides of the seat back frame for securing the additional guide tube to the seat back frame.

21. The assembly of claim 19 wherein the seat back frame includes a flat portion, and the aperture extends through the flat portion.

22. The assembly of claim 19 wherein the seat back frame is sandwiched between the swaged portions.

23. The assembly of claim 19 wherein the swaged portions abut the seat back frame, and the seat back frame is sandwiched between the swaged portions.

24. The assembly of claim 23 wherein each swaged portion has an annular shape.

25. The assembly of claim 19 wherein the seat back frame includes a laterally extending portion, and the first and second radially extending swaged portions are disposed on opposite sides of the laterally extending portion such that the laterally extending portion is sandwiched between the swaged portions.

26. The assembly of claim 19 further comprising a head rest support bar adjustably supported within the head rest guide tube.

27. The assembly of claim 19 further comprising a head rest adjustment mechanism supported by the head rest guide tube, and a head rest support bar adjustably supported within the head rest adjustment mechanism.

28. The assembly of claim 19 wherein the seat back frame comprises aluminum, and the head rest guide tube comprises steel.

29. A vehicle seat assembly comprising:
    a seat back frame having an aperture extending therethrough;
    a head rest guide tube disposed in the aperture and having a radially extending swaged portion engaged with the seat back frame for securing the guide tube to the seat back frame; and
    a head rest support bar adjustably supported within the head rest guide tube.

30. A vehicle seat assembly comprising:
    a seat back frame having an aperture extending therethrough;
    a head rest guide tube disposed in the aperture and having first and second radially extending swaged portions that are disposed on opposite sides of the seat back frame for securing the guide tube to the seat back frame; and
    a head rest support bar adjustably supported within the head rest guide tube.

* * * * *

UNITED STATES PATENT AND TRADEMARK OFFICE
CERTIFICATE OF CORRECTION

| | | |
|---|---|---|
| PATENT NO. | : 7,213,887 B2 | Page 1 of 1 |
| APPLICATION NO. | : 10/904938 | |
| DATED | : May 8, 2007 | |
| INVENTOR(S) | : Eugene S. Dudash et al. | |

It is certified that error appears in the above-identified patent and that said Letters Patent is hereby corrected as shown below:

Column 4, Line 60, Claim 11:

Delete "fiat" and insert therefor -- flat --.

Column 4, Line 61, Claim 11:

Delete "fiat" and insert therefor -- flat --.

Signed and Sealed this

Twenty-eighth Day of August, 2007

JON W. DUDAS
*Director of the United States Patent and Trademark Office*